US 9,934,096 B2

(12) United States Patent
Matsumoto et al.

(10) Patent No.: US 9,934,096 B2
(45) Date of Patent: Apr. 3, 2018

(54) FAULT MANAGEMENT SYSTEM

(71) Applicant: KYOCERA Document Solutions Inc.

(72) Inventors: Atsushi Matsumoto, Osaka (JP); Toyoaki Oku, Osaka (JP); Takeshi Nakamura, Osaka (JP); Ryuichi Ishizu, Osaka (JP); Katsuhiro Minoru, Osaka (JP)

(73) Assignee: Kyocera Document Solutions, Inc (JP)

( * ) Notice: Subject to any disclaimer, the term of this patent is extended or adjusted under 35 U.S.C. 154(b) by 142 days.

(21) Appl. No.: 14/938,764

(22) Filed: Nov. 11, 2015

(65) Prior Publication Data
US 2016/0139994 A1 May 19, 2016

(30) Foreign Application Priority Data

Nov. 14, 2014 (JP) ................. 2014-231651

(51) Int. Cl.
G06F 11/07 (2006.01)
G06F 11/14 (2006.01)
G06F 3/12 (2006.01)
H04N 1/00 (2006.01)

(52) U.S. Cl.
CPC .......... *G06F 11/1417* (2013.01); *G06F 3/12* (2013.01); *G06F 11/0733* (2013.01); *G06F 11/0748* (2013.01); *G06F 11/0793* (2013.01); *H04N 1/00* (2013.01); *G06F 2201/805* (2013.01)

(58) Field of Classification Search
CPC ............. G06F 11/0733; G06F 11/0748; H04N 1/00002
See application file for complete search history.

(56) References Cited

U.S. PATENT DOCUMENTS

| 7,679,764 | B2 * | 3/2010 | Shima | ................ | H04N 1/00244 |
| | | | | | 358/1.14 |
| 2002/0056015 | A1 * | 5/2002 | Nakai | ................. | G06F 11/0733 |
| | | | | | 710/18 |
| 2002/0194214 | A1 | 12/2002 | Fuji | | |
| 2005/0179931 | A1 * | 8/2005 | Yamaguchi | ......... | G06F 11/0733 |
| | | | | | 358/1.14 |
| 2007/0047454 | A1 | 3/2007 | Fujii | | |
| 2007/0285689 | A1 * | 12/2007 | Hozumi | .............. | G06F 11/0733 |
| | | | | | 358/1.9 |

(Continued)

FOREIGN PATENT DOCUMENTS

| EP | 1187024 | 3/2002 |
| JP | 2002-082816 | 3/2002 |

(Continued)

*Primary Examiner* — Yolanda L Wilson

(57) ABSTRACT

In a fault management system, each of one or more image forming apparatuses includes an agent unit that transmits, upon occurrence of a fault, a notice that the fault has occurred and service call information indicative of details of the fault to a fault management server. The fault management server includes a manager unit that transmits a reboot command to the agent unit of the image forming apparatus in which the fault has occurred, upon reception of the notice and the service call information from the agent unit of the image forming apparatus in which the fault has occurred. The agent unit of the image forming apparatus in which the fault has occurred reboots the image forming apparatus in which the fault has occurred, according to the reboot command.

2 Claims, 4 Drawing Sheets

(56) References Cited

U.S. PATENT DOCUMENTS

| | | | |
|---|---|---|---|
| 2009/0210283 A1 | 8/2009 | Fujitsu | |
| 2011/0150507 A1* | 6/2011 | Kim | G03G 15/55 |
| | | | 399/31 |
| 2011/0170134 A1* | 7/2011 | Murashima | G06F 11/0733 |
| | | | 358/1.15 |
| 2013/0163032 A1* | 6/2013 | Hamano | G06F 3/1296 |
| | | | 358/1.14 |
| 2016/0378584 A1* | 12/2016 | Oku | G06F 11/079 |
| | | | 358/1.14 |

FOREIGN PATENT DOCUMENTS

| | | |
|---|---|---|
| JP | 2003-076533 | 3/2003 |
| JP | 2005-219247 | 8/2005 |
| JP | 2007-060404 | 3/2007 |
| JP | 2008-287501 | 11/2008 |
| JP | 2009-099135 | 5/2009 |

\* cited by examiner

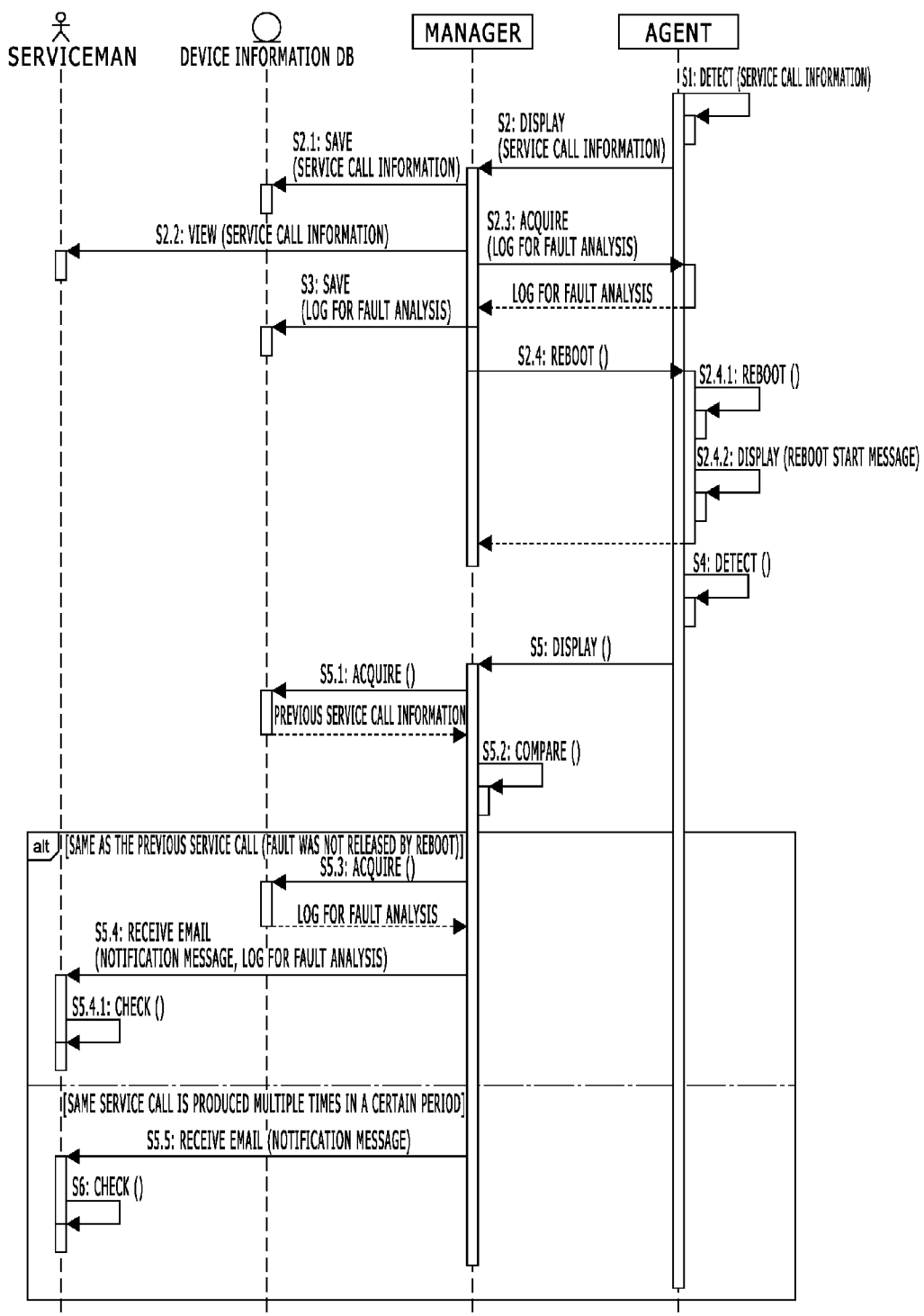

FAULT MANAGEMENT SYSTEM

CROSS-REFERENCE TO RELATED APPLICATIONS

This application relates to and claims priority rights from Japanese Patent Application No. 2014-231651, filed on Nov. 14, 2014, the entire disclosures of which are hereby incorporated by reference herein.

BACKGROUND

1. Field of the Present Disclosure

The present disclosure relates to a fault management system, a fault management server, and a non-transitory computer-readable storage medium in which the fault management program is stored.

2. Description of the Related Art

An image forming apparatus (e.g. Multifunction Peripheral (MFP)) may be subjected to a fault that occurs while being operated at a user site, so that methods of reducing the time and effort of users and servicemen for addressing a fault upon occurrence of the fault have been devised.

For example, a typical image forming apparatus can reboot automatically and appropriately without requiring a user operation for a failure from which the apparatus can recover with high possibility by turning OFF/ON of the power supply.

Furthermore, another typical image forming apparatus may be adapted such that when an error has occurred while a job is being executed, the apparatus can send support information for addressing the error to an appropriate place because the apparatus transmits the support information to a destination that is defined according to the type of the job being executed.

However, since the aforementioned technique allows an automatic reboot to be locally performed, the serviceman will never be informed of the fact that the automatic reboot was performed or the information on whether the fault has been resolved as a result of the automatic reboot. Thus, the technique is problematic from the viewpoint of collecting information for performing long-term maintenance of the image forming apparatus, e.g., for which the timing for replacing parts is taken into account.

SUMMARY

A fault management system according to one aspect of the present disclosure includes a fault management server and one or more image forming apparatuses. Each of the image forming apparatuses includes: a first communication unit configured to be able to communicate with the fault management server; and an agent unit configured to transmit, upon occurrence of a fault in the image forming apparatus, a notice that the fault has occurred and service call information indicative of details of the fault to the fault management server through the first communication unit. The fault management server includes: a second communication unit configured to be able to communicate with the one or more image forming apparatuses and a terminal of a serviceman addressing the fault; and a manager unit configured to transmit a reboot command to the agent unit of the image forming apparatus, in which the fault has occurred, upon reception of the notice that the fault has occurred and the service call information through the second communication unit from the agent unit of the image forming apparatus in which the fault has occurred. The agent unit of the image forming apparatus in which the fault has occurred reboots the image forming apparatus, in which the fault has occurred, according to the reboot command.

A fault management server according to one aspect of the present disclosure includes: a communication unit configured to be able to communicate with one or more image forming apparatuses and a terminal of a serviceman addressing a fault; and a manager unit configured to transmit a reboot command to the image forming apparatus, in which the fault has occurred, upon reception of a notice that the fault has occurred and service call information indicative of the details of the fault through the communication unit from the image forming apparatus in which the fault has occurred.

A non-transitory computer-readable storage medium according to one aspect of the present disclosure has a fault management program stored therein. The fault management program causes a computer to execute the procedures of: receiving a notice that a fault has occurred and service call information indicative of details of the fault from an image forming apparatus, in which the fault has occurred, through a communication unit configured to be able to communicate with one or more image forming apparatuses and a terminal of a serviceman addressing the fault; and upon reception of the service call information, transmitting a reboot command to the image forming apparatus in which the fault has occurred.

These and other objects, features and advantages of the present disclosure will become more apparent upon reading of the following detailed description along with the accompanied drawings.

BRIEF DESCRIPTION OF THE DRAWINGS

FIG. 4 is a sequence diagram illustrating the flow of processing in the fault management system 1 shown in FIG. 1.

DETAILED DESCRIPTION

A description will now be made to an embodiment of this disclosure with reference to the drawings.

[Outline and Entire Configuration of System]

First, a description will be made to the entire configuration of a fault management system according to an embodiment of this disclosure.

Figure 1:
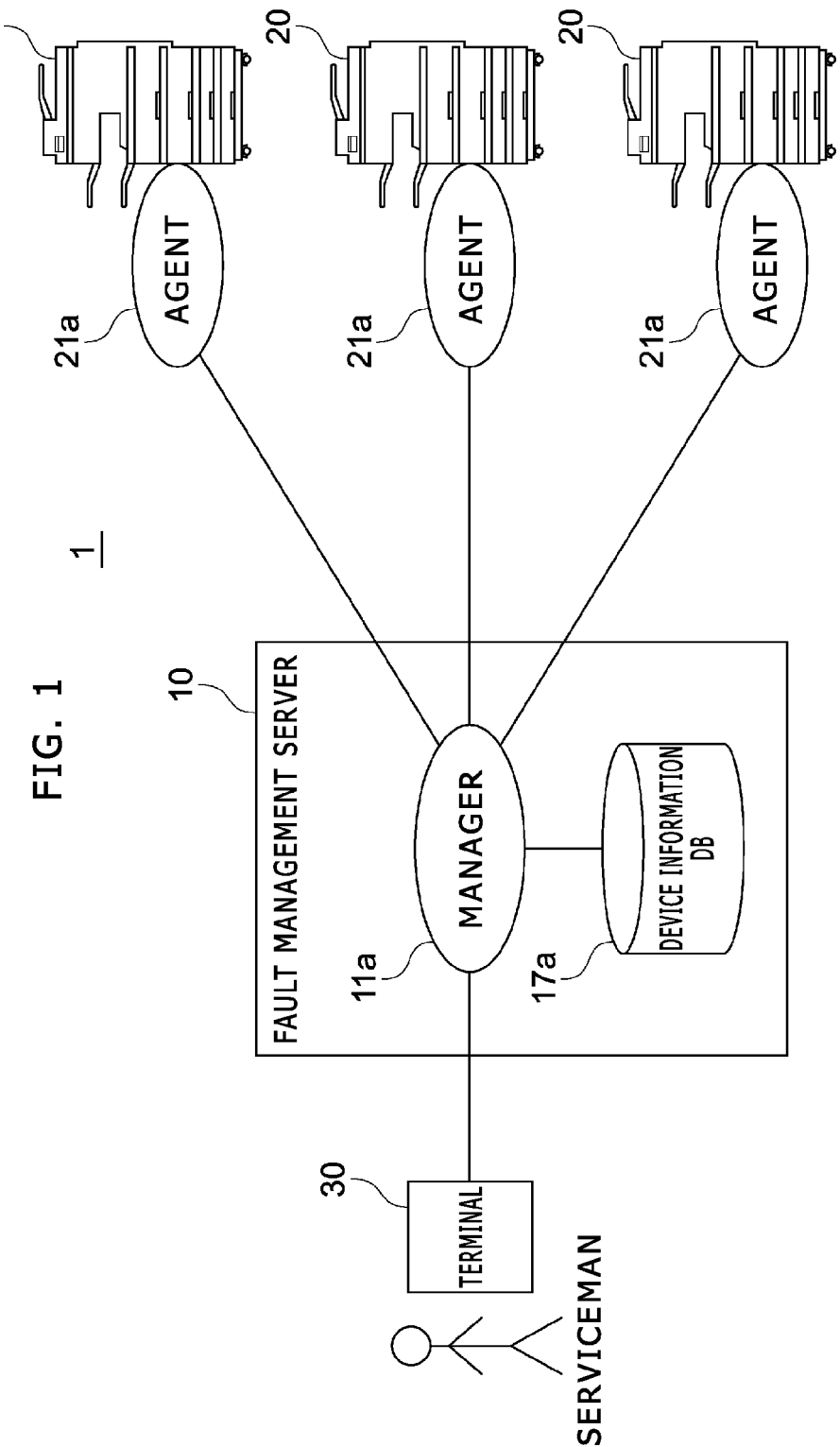
FIG. 1 is a diagram illustrating an entire configuration of a fault management system 1 according to an embodiment of this disclosure.

FIG. 1 is a diagram illustrating the entire configuration of a fault management system 1 according to the embodiment of this disclosure.

The fault management system 1 is configured to include a fault management server 10 and one or more image forming apparatuses 20.

The image forming apparatus 20 includes an agent 21a configured to address a fault that has occurred.

The fault management server 10 includes a manager 11a and a device information database (DB) 17a for addressing the fault that has occurred in the image forming apparatus 20.

When a fault has occurred in the image forming apparatus 20, information for addressing the fault is exchanged through a network between the agent 21a of the image forming apparatus 20 in which the fault has occurred and the manager 11a of the fault management server 10.

On the other hand, a serviceman for performing the maintenance of the image forming apparatus 20 exchanges information through a network with the manager 11a of the fault management server 10 via a terminal 30 so as to address the fault of the image forming apparatus 20 or plan a long-term maintenance of the image forming apparatus 20.

In the event of occurrence of a fault in the image forming apparatus 20, the agent 21a of the image forming apparatus 20 in which the fault has occurred transmits, to the manager 11a of the fault management server 10, the notice that the fault has occurred and service call information indicative of the details of the fault.

Then, the manager 11a directs to reboot the image forming apparatus 10 in which the fault has occurred.

Thus, a fault of such a sort that is to be solved by a reboot could be quickly solved without the intervention of the serviceman, thereby allowing the load of the serviceman to be reduced.

Furthermore, the serviceman is informed of the notice that a fault has occurred in the image forming apparatus 20, the service call information of the fault, the log for fault analysis, and the information of whether the fault has been solved by a reboot. Thus, the serviceman can grasp the situation of the fault, thereby taking an appropriate action when the work of the serviceman is required.

Furthermore, the manager 11a of the fault management server 10 manages the history of faults occurring in the image forming apparatus 20, thereby informing the serviceman about the tendency of faults occurring in the image forming apparatus 20 and calling attention thereto. The serviceman can appropriately make a long-term maintenance plan.

Note that the fault management server 10 and the image forming apparatus 20 will be discussed in more detail later.

In the foregoing, the description has been given to the entire configuration of the fault management system according to the embodiment of this disclosure.

[Configuration of Fault Management Server]

Figure 2:
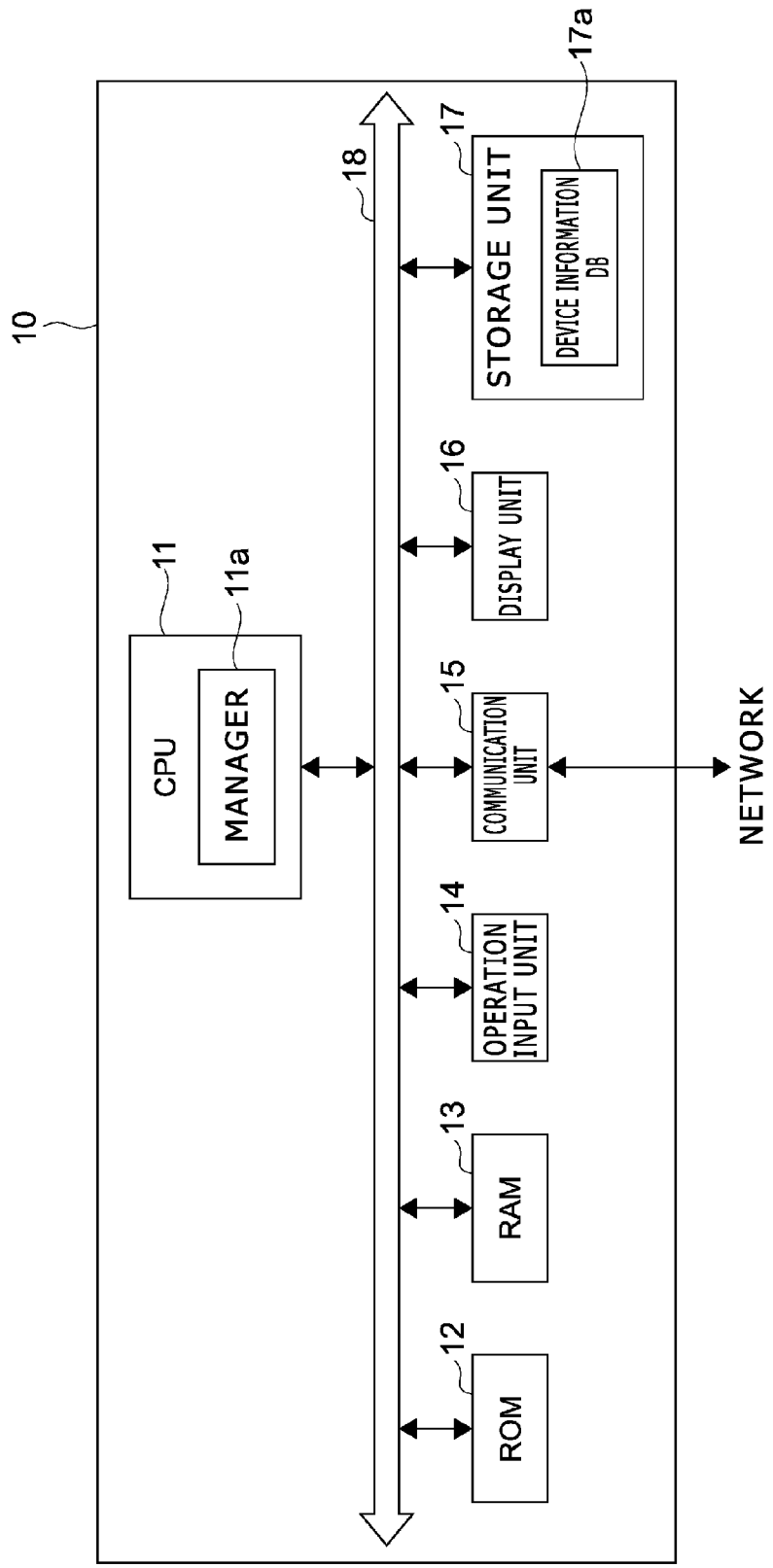
FIG. 2 is a block diagram illustrating a fault management server 10 of FIG. 1 that is made up of a typical computer.

A description will now be made to the configuration of the fault management server 10. The fault management server 10 may be made up of specific hardware or software, or may also be made up of a typical computer. FIG. 2 is a block diagram which illustrates the fault management server 10 made up of a typical computer.

As shown in FIG. 2, the fault management server 10 has a central processing unit (CPU) 11, a read only memory (ROM) 12, a random access memory (RAM) 13, an operation input unit 14, a communication unit 15, a display unit 16, and a storage unit 17, which are connected to each other via a bus 18.

The ROM 12 stores data and a plurality of programs, such as firmware, for executing various types of processing. The RAM 13 is used as a work area of the CPU 11 and temporarily holds an operating system (OS), various applications being executed, and various types of data being processed.

The storage unit 17 is, for example, a hard disk drive (HDD), a flash memory, or other nonvolatile memory devices. The storage unit 17 stores an OS, various applications, various types of data, and a device information DB 17a for addressing a fault of the image forming apparatus 20.

The device information DB 17a stores, for example, the configuration information for managing each of the image forming apparatuses 20 and the history information of faults that have occurred in the past in each of the image forming apparatuses 20. Note that as used herein, the term "device" refers to the image forming apparatus 20.

The communication unit 15 is linked to a network configured to exchange information with the image forming apparatus 20 and the terminal 30.

The CPU 11 expands one of a plurality of programs stored in the ROM 12 or the storage unit 17 into the RAM 13, the program corresponding to a command given on the operation input unit 14, and then appropriately controls the display unit 16 and the storage unit 17 according to the expanded program.

The operation input unit 14 is, for example, a pointing device such as a mouse, a keyboard, a touch panel, or other operation devices.

The display unit 16 is, for example, a liquid crystal display, an electro-luminescence (EL) display, or a plasma display.

A description will now be made to the functional block implemented by executing a program in the CPU 11.

The functional block implemented in the CPU 11 of the fault management server 10 is the manager 11a.

The manager 11a receives the notification of occurrence of a fault and the service call information relating to the fault from the image forming apparatus 20 in which the fault has occurred, and then determines an appropriate action using the device information DB 17a.

Furthermore, the manager 11a exchanges information with the serviceman so that the serviceman appropriately addresses the fault having occurred.

Note that the processing by the manager 11a will be discussed later in detail.

In the foregoing, the configuration of the fault management server 10 has been explained.

[Configuration of Image Forming Apparatus]

Figure 3:
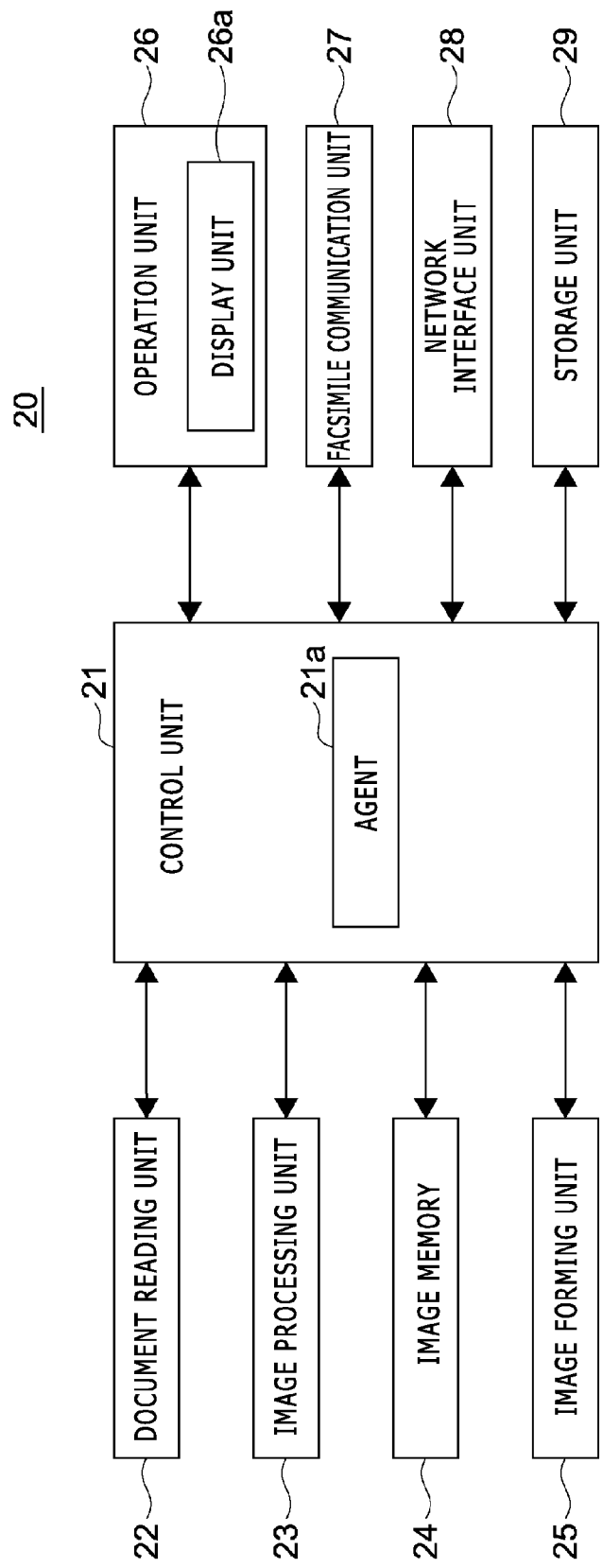
FIG. 3 is a block diagram of an image forming apparatus 20 of FIG. 1.

A description will now be made to the configuration of the image forming apparatus 20. FIG. 3 is a block diagram schematically illustrating the configuration of the image forming apparatus 20. Note that the image forming apparatus 20 is typically a multifunctional peripheral (MFP).

The image forming apparatus 20 includes a control unit 21. For example, the control unit 21 is made up of a CPU, a RAM, a ROM, and a dedicated hardware circuit, and controls the entire operation of the image forming apparatus 20.

The control unit 21 is connected, e.g., to a document reading unit 22, an image processing unit 23, an image memory 24, an image forming unit 25, an operation unit 26, a facsimile communication unit 27, a network interface unit 28, and a storage unit 29. The control unit 21 controls the operation of each of the aforementioned units connected thereto and transmits and receives signals or data to and from each of the units.

The control unit 21 follows an instruction for executing a job entered by a user, for example, on the operation unit 26 or a PC connected to a network so as to control the driving of and processing by a mechanism required to execute the operation control of each function such as the scanner function, the print function, the copy function, and the facsimile transmit/receive function.

Furthermore, the control unit 21 has the agent 21a. The agent 21a is a functional block that is implemented by the CPU executing a program loaded from the ROM or the like to the RAM.

The agent 21a informs the manager 11a of the fault management server 10 about the fault that has occurred in the image forming apparatus 20 and the service call information indicative of the details of the fault, for example, via the network interface unit 28.

The agent 21a also reboots the image forming apparatus 20 by following the instruction from the manager 11a of the fault management server 10.

Note that the processing by the agent 21a will be discussed later in more detail.

The document reading unit 22 reads an image from a document.

The image processing unit 23 performs image processing, as required, on the image data of an image read by the document reading unit 22. For example, the image processing unit 23 performs image processing such as a shading correction in order to allow the quality of the image read by the document reading unit 22 to be improved after the image is formed.

The image memory 24 temporarily stores the data of a document image read by the document reading unit 22 and temporarily stores data to be printed by the image forming unit 25.

The image forming unit 25 forms images of image data read by the document reading unit 22.

The operation unit 26 includes a touch panel unit and an operation key unit which receive a user instruction for various operations and processing that can be executed by the image forming apparatus 20. The touch panel unit includes a display unit 26a such as a liquid crystal display (LCD) that is provided with a touch panel.

The facsimile communication unit 27 includes an encoding/decoding unit (not shown), a modem unit, and a network control unit (NCU), and transmits by facsimile through a public telephone network.

The network interface unit 28 is made up of a communication module such as a LAN board, and transmits and receives various data to and from a device (such as a PC) in a local area via a LAN connected to the network interface unit 28.

The storage unit 29 stores, for example, document images read by the document reading unit 22. The storage unit 29 is a large-capacity storage device such as a HDD.

In the foregoing, the configuration of the image forming apparatus 20 has been explained.

[Flow of Processing]

A description will now be made to the flow of processing in the fault management system 1. FIG. 4 is an explanatory sequence diagram showing the flow of processing in the fault management system 1.

It is here assumed that a fault has occurred in the image forming apparatus 20.

First, the agent 21a of the image forming apparatus 20 in which the fault has occurred detects the fault that has occurred (step S1). The agent 21a also collects information relating to the fault that has occurred, and creates service call information on the basis of the information collected.

Now, the agent 21a notifies, via the network, the manager 11a of the fault management server 10 about the notice that the fault has occurred and the service call information, which are then displayed on the screen of the fault management server 10 (step S2).

Then, the manager 11a saves the notified service call information in the device information DB 17a (step S2.1).

The manager 11a then informs the terminal 30 of the serviceman about the notice that the fault has occurred, so that the serviceman accesses the fault management server 10 using the terminal 30 so as to view the details of the fault (step S2.2).

Now, the manager 11a requests the agent 21a of the image forming apparatus 20 in which the fault has occurred to send a log for the analysis of the fault (step S2.3). In response to the request, the agent 21a transmits the log for the analysis of the fault to the manager 11a.

Then, the manager 11a saves the log for the analysis of the fault acquired from the agent 21a in the device information DB 17a (step S3).

Then, the manager 11a commands the agent 21a of the image forming apparatus 20 in which the fault has occurred to reboot the image forming apparatus 20 (step S2.4).

Then, the agent 21a that has received the reboot command reboots the image forming apparatus 20 (step S2.4.1).

Then, the agent 21a that has rebooted the image forming apparatus 20 allows a message indicating the reboot having been performed to be displayed on the display unit 26a of the image forming apparatus 20 (step S2.4.2).

Then, the agent 21a of the image forming apparatus 20 that has performed the reboot detects the presence or absence of a fault in order to determine whether the fault has been resolved by the reboot (step S4). When no fault has been detected, the processing below does not need to be carried out.

Note that assuming here that the fault has been detected (the fault has not been resolved), a description will be made to the following processing.

If the fault is detected again, the agent 21a notifies the manager 11a of the fault management server 10 about the notice that the fault has occurred and the service call information indicative of details of the fault, so that the manager 11a displays the contents of the notification on the screen of the fault management server 10 (step S5).

Then, the manager 11a acquires, from the device information DB 17a, the service call information that has been saved in step S2.1 (step S5.1).

Then, the manager 11a compares the previous service call information with the service call information on the fault that has occurred after the reboot, both pieces of service call information having been acquired from the device information DB 17a (step S5.2).

The comparison may show that both the previous service call information and the service call information on the fault that has occurred after the reboot are the same. In this case, the manager 11a determines that the fault has not been resolved by the reboot and the serviceman has to address the fault and acquires, from the device information DB 17a, the log for the analysis of the fault saved in step S3 (step S5.3).

Then, the manager 11a sends the acquired log for the analysis of the fault to the terminal 30 of the serviceman by email or the like in conjunction with the message that the fault was not resolved by the reboot (step S5.4).

Then, the serviceman checks, for example, the contents of the received message (step S5.4.1).

Note that if the previous service call information is found as a result of a comparison to be different from the service call information of the fault that has occurred after the reboot, the manager 11a may return to step S2.1 to repeat the process.

Note that even when no fault has been detected in step S4, the manager 11a checks the device information DB 17a for the history of occurrence of past faults in the image forming apparatus 20 in which the fault has occurred, and may notify the serviceman by email about the fact that the same fault has occurred more frequently than a certain number of times during a certain period (step S5.5). Note that the length of the certain period may be set by the user.

After the serviceman has checked by email or the like that the same fault occurred more frequently than a certain number of times during a certain period in a particular image forming apparatus 20 (step S6), the serviceman can plan, for example, a schedule for replacement of parts.

As described above, according to the aforementioned embodiment, it is possible to quickly solve the fault of the image forming apparatus in proper cooperation with the serviceman.

The description has been presented for purposes of illustration and description, and is not intended to be exhaustive or limited.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. A fault management system, comprising:
   a fault management server; and
   one or more image forming apparatuses,
   wherein each of the image forming apparatuses includes:
      a first communication unit configured to be able to communicate with the fault management server; and
      an agent unit configured to transmit, upon occurrence of a fault in the image forming apparatus, a notice that the fault has occurred and service call information indicative of details of the fault to the fault management server through the first communication unit,
   the fault management server includes:
      a second communication unit configured to be able to communicate with the one or more image forming apparatuses and a terminal of a serviceman addressing the fault; and
      a manager unit configured to transmit a reboot command to the agent unit of the image forming apparatus, in which the fault has occurred, upon reception of the notice that the fault has occurred and the service call information through the second communication unit from the agent unit of the image forming apparatus in which the fault has occurred, and
   the agent unit of the image forming apparatus in which the fault has occurred reboots the image forming apparatus, in which the fault has occurred, according to the reboot command; wherein:
   the fault management server further includes a storage unit configured to store the service call information received from the agent unit of the image forming apparatus in which the fault has occurred,
   the agent unit of the image forming apparatus in which the fault has occurred reboots the image forming apparatus in which the fault has occurred on the basis of the reboot command, and then when the fault is detected again, transmits, to the fault management server, a notice that the fault has occurred and service call information indicative of details of the fault; and
   the manager unit of the fault management server acquires a log for fault analysis from the agent unit of the image forming apparatus in which the fault has occurred, and upon reception of the notice that the fault has occurred again after the image forming apparatus in which the fault occurred has been rebooted, transmits, to the terminal of the serviceman, the acquired log for fault analysis and the notice that the fault was not solved by the reboot.

2. The fault management system according to claim 1, wherein:
   the storage unit of the fault management server stores, as history information, the service call information received from the agent unit of the image forming apparatus in which the fault has occurred; and
   when it is determined on the basis of the history information that the same fault has occurred more frequently in a certain period than a certain number of times in a particular image forming apparatus, the manager unit of the fault management server informs the terminal of the serviceman about a notice that the same fault has occurred more frequently in the certain period than the certain number of times in the particular image forming apparatus.

* * * * *